(12) United States Patent
Liu

(10) Patent No.: US 10,446,979 B1
(45) Date of Patent: Oct. 15, 2019

(54) POWER PLUG ADAPTER WITH MAGNETICALLY ATTACHABLE MODULE

(71) Applicant: PRODIGIT ELECTRONICS CO., LTD., New Taipei (TW)

(72) Inventor: Daniel Liu, New Taipei (TW)

(73) Assignee: Prodigit Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/043,597

(22) Filed: Jul. 24, 2018

(30) Foreign Application Priority Data

Jul. 18, 2018 (TW) .............................. 107209719 U

(51) Int. Cl.
```
G05D 11/00      (2006.01)
H01R 13/62      (2006.01)
H01R 31/06      (2006.01)
G06F 3/0488     (2013.01)
H01R 13/66      (2006.01)
```
(52) U.S. Cl.
CPC ....... H01R 13/6205 (2013.01); G06F 3/0488 (2013.01); H01R 13/6683 (2013.01); H01R 13/6691 (2013.01); H01R 31/065 (2013.01)

(58) Field of Classification Search
CPC ....... H02J 3/14; H04H 20/67; G05B 19/0421; G05B 15/02; G05B 13/024; G06F 17/40; H04L 29/08108; H04L 29/06027; H04W 8/245; H03J 9/002; H03J 9/04

USPC ............. 700/295, 3, 9, 10, 32; 455/3.03, 92, 455/151.1, 352, 419
See application file for complete search history.

(56) References Cited

U.S. PATENT DOCUMENTS

| | | | |
|---|---|---|---|
| 5,626,479 A * | 5/1997 | Hughes | B60D 1/62 439/35 |
| 9,634,435 B1 * | 4/2017 | Raschilla | H01R 13/6683 |
| 2016/0181744 A1 * | 6/2016 | Kao | H01R 24/60 439/676 |
| 2016/0254613 A1 * | 9/2016 | Choi | H01R 13/5829 439/31 |
| 2018/0054023 A1 * | 2/2018 | Greig | H01R 13/6205 |

* cited by examiner

*Primary Examiner* — Phuong Chi T Nguyen
(74) *Attorney, Agent, or Firm* — Rosenberg, Klein & Lee

(57) ABSTRACT

A power plug adapter with a magnetically attachable module is provided. A signal transmission device is connected with the power plug adapter and the magnetically attachable module. At least one magnetic unit is arranged on the power plug adapter, and at least one counterpart magnetic unit is arranged on the magnetically attachable module. When the magnetically attachable module and the power plug adapter are arranged to have attachment surfaces thereof adjacent to and facing each other, the counterpart magnetic unit of the magnetically attachable module magnetically attracts the attachment surface of the power plug adapter to have the magnetically attachable module and the power plug adapter attached to each other magnetically.

11 Claims, 8 Drawing Sheets

US 10,446,979 B1

POWER PLUG ADAPTER WITH MAGNETICALLY ATTACHABLE MODULE

BACKGROUND OF THE INVENTION

1. Field of the Invention

The present invention relates to an improved wall socket, and in particular to a power plug adapter with magnetically attachable module.

2. The Related Arts

Power sockets are essential devices for use in for example household applications, office, workshops, and public sites. Power sockets take different forms in different countries and different areas and have different specification for applicable voltages. However, a conventional power socket provides only one single use of receiving a plug to insert therein for supply of electrical power.

Unless an electric meter is used to take measurement of data, otherwise when a user is using a conventional power socket, it is generally not possible for the user to realize data of electricity, such as voltage, current, and power. To cope with such a problem, a power plug adapter that includes an electric meter is available in the market. A specific one of such a meter-included power plug adapter includes a single housing in which a plug, a socket, and an electric meter are all arranged. Using such a power plug adapter may require a user to bend or squat in order to observe or operate the electric meter, because the power socket is often arranged at a location of a wall that is close to the floor. This is not an ergonomic design.

Another product of the meter-included power plug adapter includes a plug that is separate from a plugging adapter and an electric meter with an electric cable connected therebetween in order to allow easy observation and operation by a user. A disadvantage is that the separately arranged electric meter would requires an additional fixture for positioning during an extended period of observation of the reading thereof and an additional location must be found for stowing the meter after the observation.

SUMMARY OF THE INVENTION

In view of the above, a primary objective of the present invention is to provide a power plug adapter with magnetically attachable module in order to provide, in a meter-included power plug adapter, a retention site for holding separate electric meter of the adapter.

The present invention provides a power plug adapter that comprises a power plug adapter, a magnetically attachable module, and a signal transmission device connected with the power plug adapter and the magnetically attachable module. At least one magnetic unit is arranged on the power plug adapter, and at least one counterpart magnetic unit is arranged on the magnetically attachable module. The magnetically attachable module is positionable to have a counterpart attachment surface thereof adjacent to and facing an attachment surface of the power plug adapter so that the counterpart magnetic unit of the magnetically attachable module magnetically attracts the attachment surface of the power plug adapter thereby making the magnetically attachable module and the power plug adapter attached to each other magnetically.

In the above, the signal transmission device is connected, through electrical cables, to a first circuit of the power plug adapter and a second circuit of the magnetically attachable module.

In the above, the signal transmission device comprises a first wireless transceiver that is connected to the first circuit and a second wireless transceiver connected to the second circuit of the magnetically attachable module, so that wireless connection between the first circuit and the second circuit is established through the first wireless transceiver and the second wireless transceiver.

In the above, the first circuit comprises a voltage sensor connected to insertion holes of the power plug adapter and a current sensor connected between the insertion holes and prongs.

In the above, the second circuit comprises a data processor and a display unit connected to the data processor.

In the above, the display unit comprises a touch display unit.

In the above the data processor is further connected with an operation unit.

The efficacy of this invention is that the power plug adapter and the magnetically attachable module are coupled with each other with a signal transmission device arranged therebetween so as to transmit signals of voltage and current of the power plug adapter to the magnetically attachable module, whereas the power plug adapter and the magnetically attachable module are respectively provided with a magnetic unit and a counterpart magnetic unit. As such, a user may readily operate and watch the magnetically attachable module, and the magnetically attachable module is removably mounted to the power plug adapter. Further, the power plug adapter is selectively provided, on a side surface, a top surface, and a bottom surface thereof, with a magnetic unit, in order to accommodate different orientations of wall sockets at for example 0°, 90°, 180°, and 270°, for installation of the magnetically attachable module, in such a way that the magnetically attachable module may be constantly set at a direction desired by the user.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
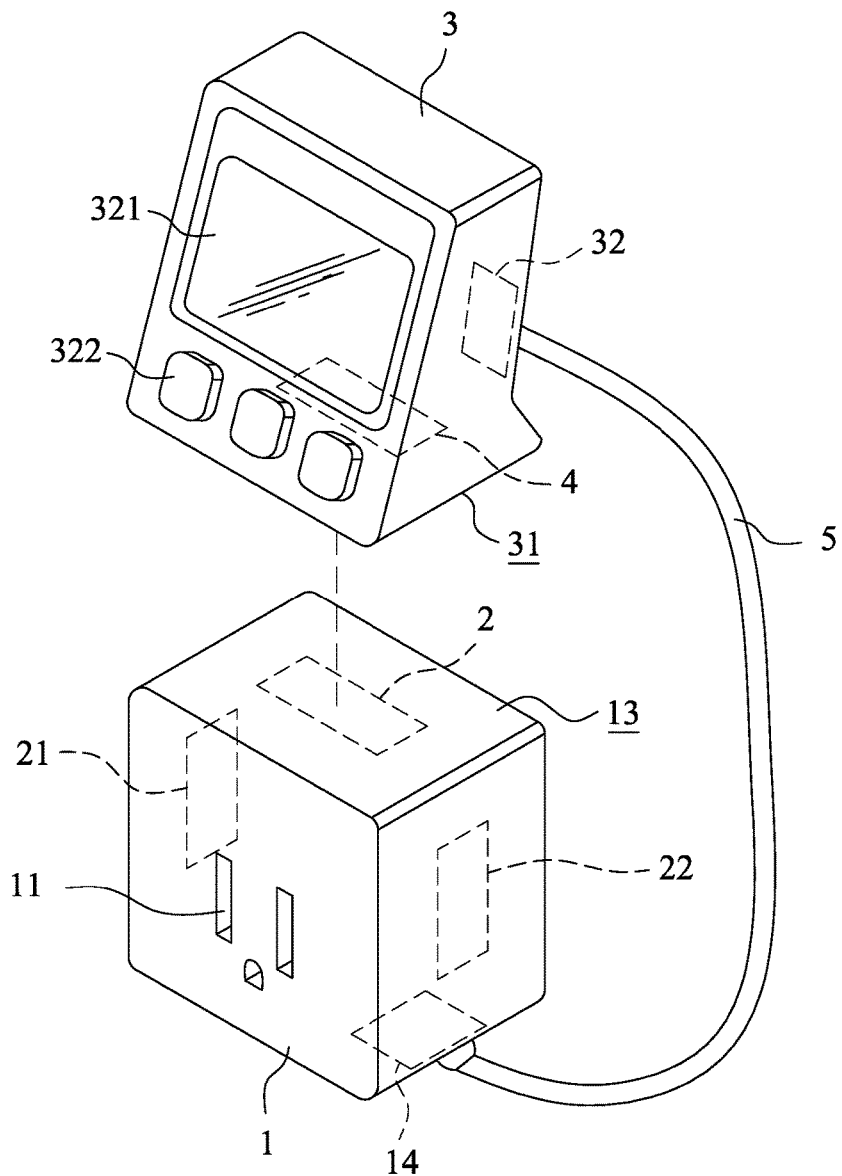
FIG. 1 is a perspective view showing a power plug adapter with magnetically attachable module according to a first embodiment of the present invention in a detached condition.
Figure 2:
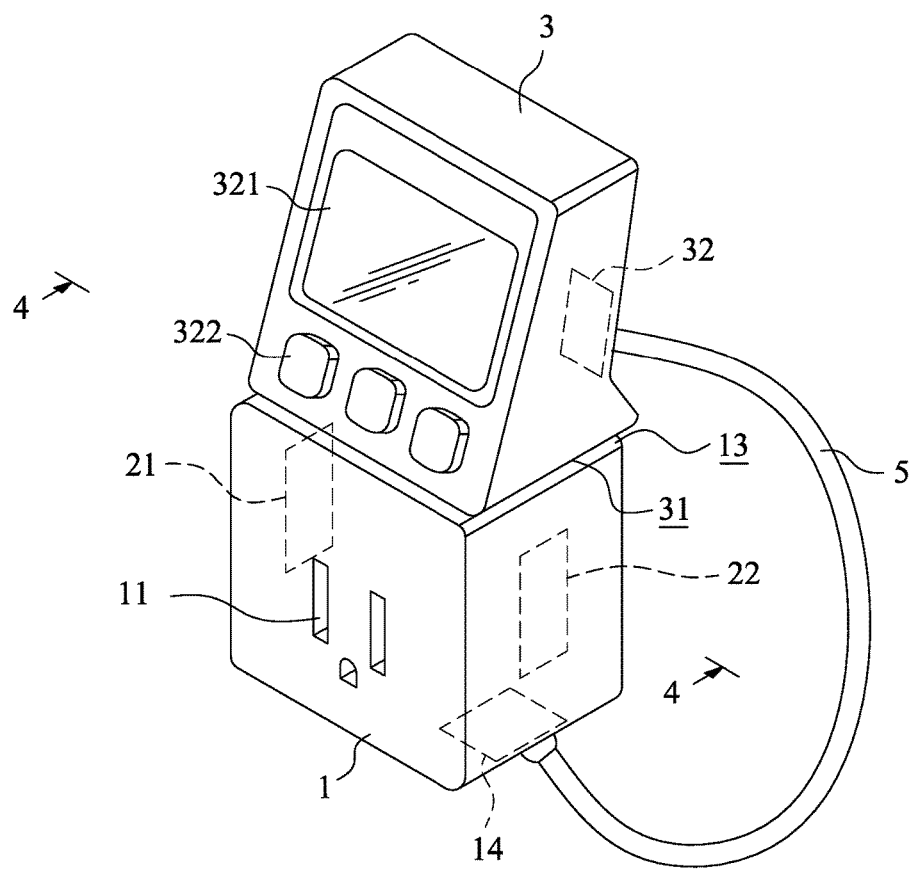
FIG. 2 is a perspective view showing the power plug adapter with magnetically attachable module according to the first embodiment of the present invention in an attached and combined condition.
Figure 3:
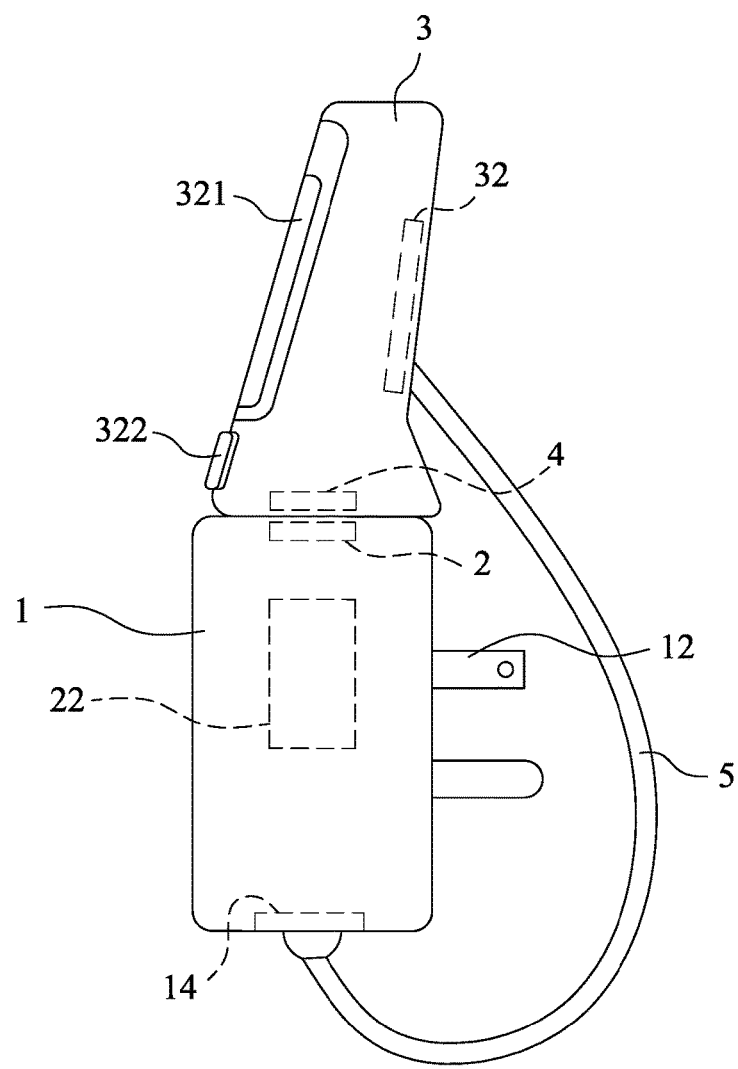
FIG. 3 is a side elevational view showing the power plug adapter with magnetically attachable module according to the first embodiment of the present invention in the attached and combined condition m.

Referring collectively to FIGS. 1-3, the present invention provides, as a first embodiment, a power plug adapter with magnetically attachable module, which comprises a power plug adapter 1. The power plug adapter 1 comprises a pair of insertion holes 11 and a pair of outward-projecting prongs 12.

The power plug adapter 1 defines one or multiple attachment surfaces 13. The power plug adapter 1 including a housing having an interior space in which at least one magnetic unit 2, 21, 22 is fixed, through interferential fitting or adhesive bonding, at a location corresponding to a respective one of the attachment surfaces 13. The housing of the power plug adapter 1 receives a first circuit 14 arranged in the interior space thereof.

A magnetically attachable module 3 defines a counterpart attachment surface 31. The magnetically attachable module 3 includes a casing having an interior space in which at least one counterpart magnetic unit 4 is fixed, through interferential fitting or adhesive bonding, at a location corresponding to the attachment surfaces 31. The casing of magnetically attachable module 3 receives a second circuit 32 arranged in the interior space thereof and electrically connected with a display unit 321 and an operation unit 322.

A signal transmission device 5 is connected, through electrical cables, to and between the first circuit 14 of the power plug adapter 1 and the second circuit 32 of the magnetically attachable module 3 for transmission and receipt of signals between the power plug adapter 1 and the magnetically attachable module 3.

When a user places the magnetically attachable module 3 to have the counterpart attachment surface 31 thereof facing and close to a selected one of the attachment surfaces 13 of the power plug adapter 1, due to magnetic attraction between the counterpart magnetic unit 4 of the magnetically attachable module 3 and the magnetic unit 2 of the power plug adapter 1, the magnetically attachable module 3 is attached, magnetically, to the power plug adapter 1. The magnetic unit 2 may comprise a steel or iron plate or a magnet, and the counterpart magnetic unit 4 may comprises a magnet or steel or iron plate corresponding thereto.

Figure 4:
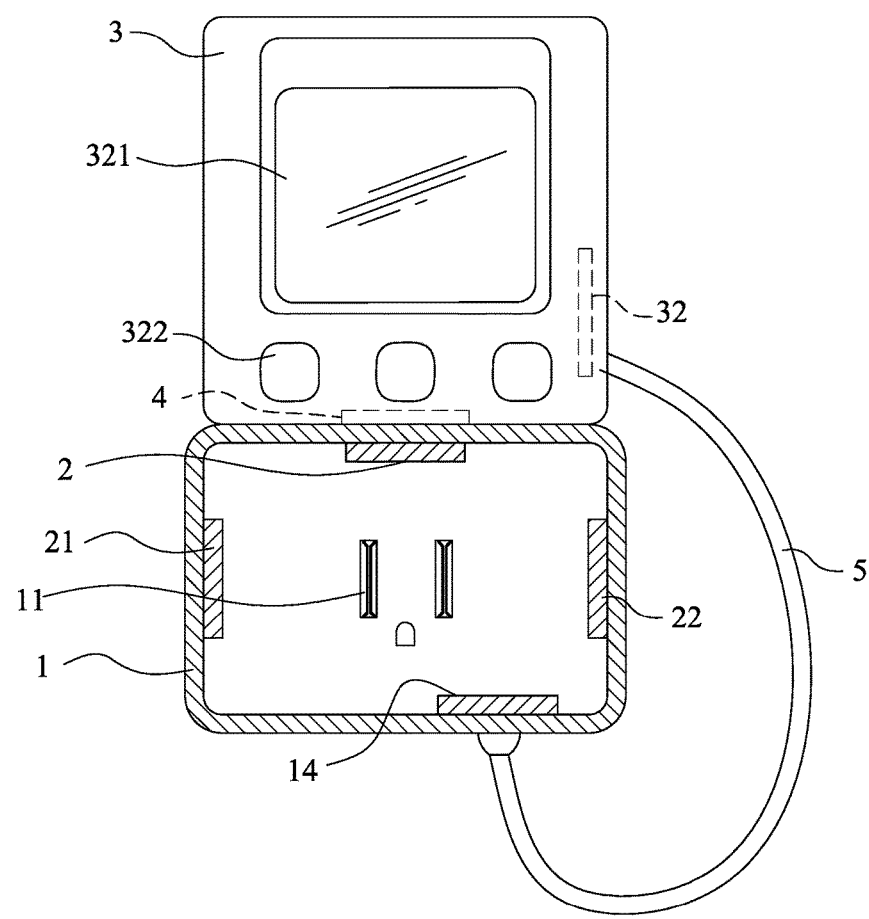
FIG. 4 is a cross-sectional view taken along line 4-4 of FIG. 2.
Figure 5:
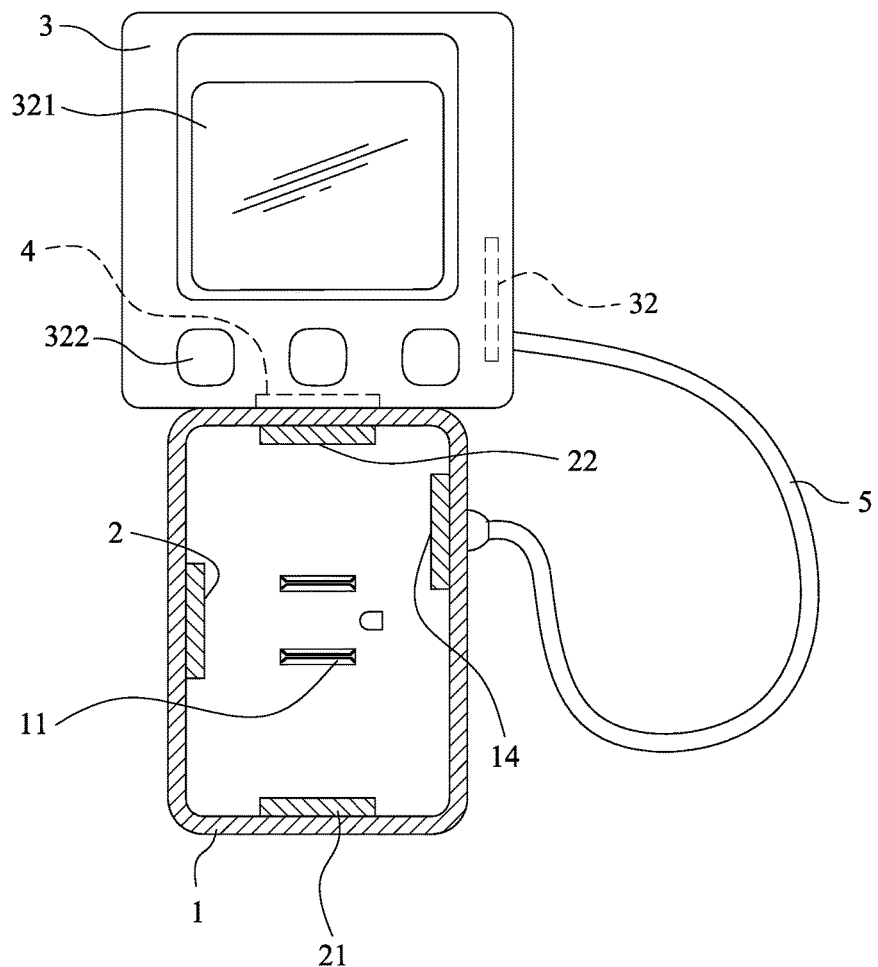
FIG. 5 is a schematic view showing a condition that a plug adapter of FIG. 4 is rotated counterclockwise by 90 degrees to allow a magnetically attachable module to be attached to a side of the plug adapter that faces upward.

Also referring to FIG. 4, a cross-sectional view taken along line 4-4 of FIG. 2 is shown. The housing of the power plug adapter 1 may be provided, in the interior space thereof, with multiple magnetic units 2, 21, 22, when the prongs 12 of the power plug adapter 1 are inserted into wall sockets at different directions, the magnetically attachable module 3 is allowed to attach, through magnetic attraction realized with the counterpart magnetic unit 4 thereof, to a surface or a side of the power plug adapter 1 that faces upwards (as shown in FIG. 5). In this way, it is possible to always keep the display unit 321 and the operation unit 322 of the magnetically attachable module 3 facing a side that is readily observable and operable by a user, without being affected or constrained by the direction in which the insertion holes 11 or the prongs 12 are set.

In a practical example, the magnetically attachable module 3 may be equipped with only the display unit 321, or alternatively be only equipped with the operation unit 322, or alternatively, be equipped with both the display unit 321 and the operation unit 322.

Figure 6:
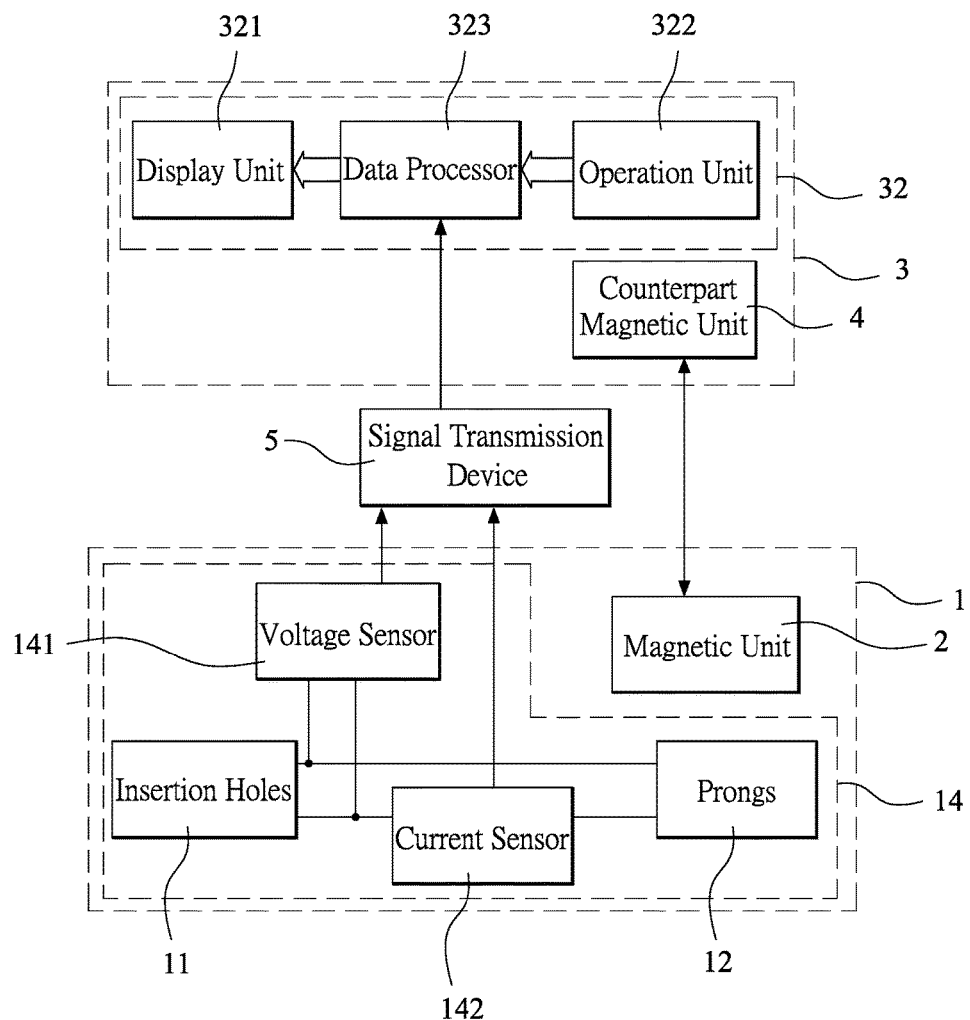
FIG. 6 is a circuit block diagram of the first embodiment of the present invention.

FIG. 6 shows a functional block diagram of a circuit of the present invention. The first circuit 14 of the power plug adapter 1 comprises a voltage sensor 141 connected, in parallel, with the insertion holes 11 and a current sensor 142 connected, in series, between the insertion holes 11 and the prongs 12 in order to detect a voltage value and a current value of the power plug adapter 1, respectively, to transmit the voltage value and the current value so detected through the signal transmission device 5 to the second circuit 32 of the magnetically attachable module 3.

The second circuit 32 comprises a data processor 323, which is electrically connected with the display unit 321 and the operation unit 322. The data processor 323, when receiving the voltage value and the current value that are transmitted from the first circuit 14 through the signal transmission device 5, may display the voltage value, the current value and/or other calculated signals (such as power value) on the display unit 321. The user may operate, by means of the operation unit 322, various functions of the data processor 323.

FIG. 6 illustrates an example in which the display unit 321 and the operation unit 322 are arranged as two independent units for illustration of the present invention. However, in an actual example, a touch display unit, which is well known and widely used, may be provided to replace the display unit 321 and the operation unit 322, so that the user may operate, by means of the touch display unit, the data processor 323 through touch-controlling.

Figure 7:
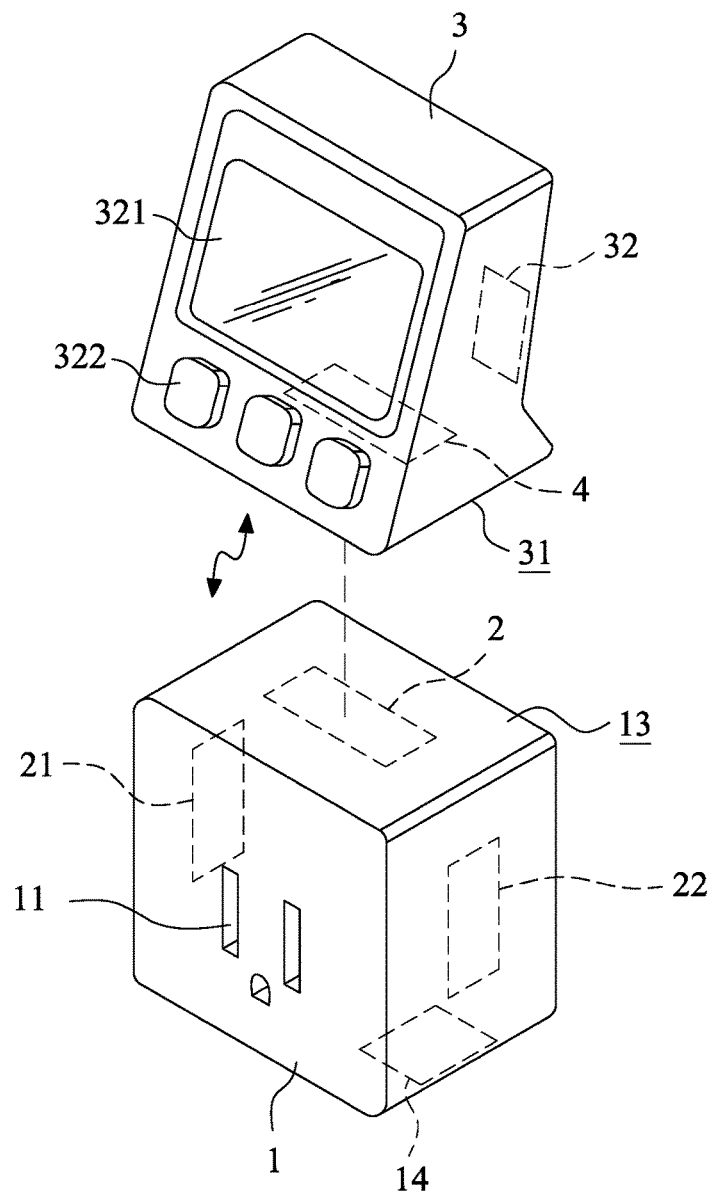
FIG. 7 is a perspective view showing a power plug adapter with magnetically attachable module according to a second embodiment of the present invention in a detached condition.
Figure 8:
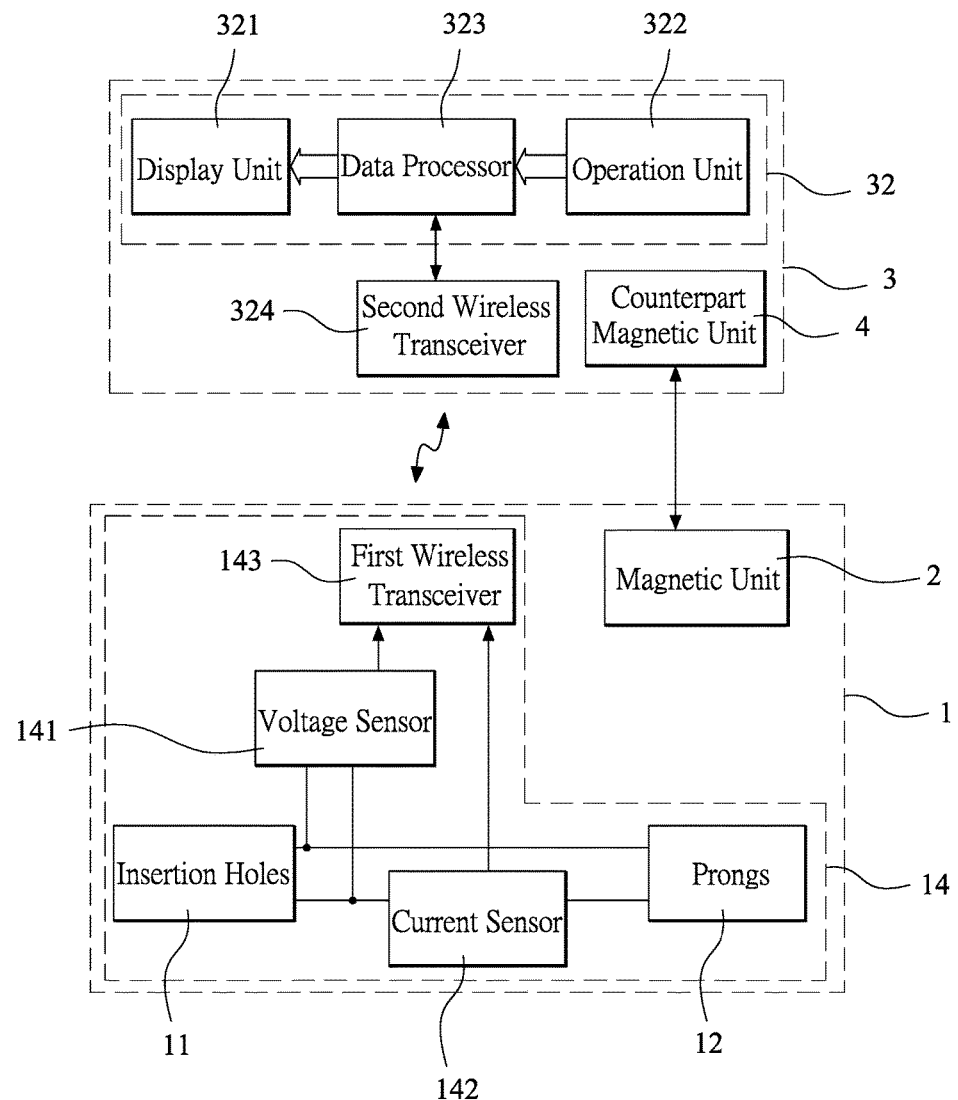
FIG. 8 is a circuit block diagram of the second embodiment of the present invention.

FIG. 7 is a perspective view showing a power plug adapter with magnetically attachable module according to a second embodiment in a detached condition. FIG. 8 illustrates a functional block diagram of a circuit of the second embodiment of the present invention. The instant embodiment has a structural arrangement that is generally identical to that of the first embodiment, and thus, identical parts/components are designated with the same reference for consistency.

In the instant embodiment, a power plug adapter 1 comprises a first circuit 14 that comprises a first wireless transceiver 143, which is electrically connected with the voltage sensor 141 and the current sensor 142. A second wireless transceiver 324 is arranged inside the magnetically attachable module 3 and is electrically connected with the data processor 323.

Through the first wireless transceiver 143 and the second wireless transceiver 324, wireless connection could be established (through for example radio frequency signals, infrared, Bluetooth signals, or other wireless signals), between the voltage sensor 141 and the current sensor 142 of the power plug adapter 1 and the data processor 323 of the magnetically attachable module 3.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A power plug adapter, comprising:
  a power plug provided with a pair of insertion holes and a pair of outward-projecting prongs, the power plug adapter defining at least one attachment surface;
  a first circuit arranged in the power plug adapter;

a magnetically attachable module defining at least one counterpart attachment surface;
a second circuit arranged in the magnetically attachable module, the second circuit comprising a display unit arranged on the magnetically attachable module;
a signal transmission device electrically connecting the first circuit of the power plug adapter and the second circuit of the magnetically attachable module;
at least one magnetic unit arranged on the at least one attachment surface of the power plug adapter; and
at least one counterpart magnetic unit arranged on the at least one counterpart attachment surface of the magnetically attachable module;
wherein the magnetically attachable module is positionable in such a way that the at least one counterpart attachment surface thereof is adjacent to and facing the at least one attachment surface of the power plug adapter, the at least one counterpart magnetic unit and the at least one magnetic unit attract each other magnetically to have the magnetically attachable module magnetically attached to the power plug adapter.

2. The power plug adapter according to claim 1, wherein the signal transmission device is connected, through electrical cables, to the first circuit of the power plug adapter and the second circuit of the magnetically attachable module.

3. The power plug adapter according to claim 1, wherein the signal transmission device comprises a first wireless transceiver that is connected to the first circuit and a second wireless transceiver connected to the second circuit of the magnetically attachable module, so that wireless connection between the first circuit and the second circuit is established through the first wireless transceiver and the second wireless transceiver.

4. The power plug adapter according to claim 1, wherein the first circuit comprises a voltage sensor connected to the insertion holes and a current sensor connected between the insertion holes and the prongs.

5. The power plug adapter according to claim 1, wherein the second circuit comprises a data processor and the display unit is connected to the data processor.

6. The power plug adapter according to claim 5, wherein the display unit comprises a touch display unit.

7. The power plug adapter according to claim 5, wherein the data processor is further connected with an operation unit.

8. A power plug adapter, comprising:
a power plug provided with a pair of insertion holes and a pair of outward-projecting prongs, the power plug adapter defining at least one attachment surface;
a first circuit arranged in the power plug adapter;
a magnetically attachable module defining at least one counterpart attachment surface;
a second circuit arranged in the magnetically attachable module, the second circuit comprising an operation unit arranged on the magnetically attachable module;
a signal transmission device electrically connecting the first circuit of the power plug adapter and the second circuit of the magnetically attachable module;
at least one magnetic unit arranged on the at least one attachment surface of the power plug adapter; and
at least one counterpart magnetic unit arranged on the at least one counterpart attachment surface of the magnetically attachable module;
wherein the magnetically attachable module is positionable in such a way that the at least one counterpart attachment surface thereof is adjacent to and facing the at least one attachment surface of the power plug adapter, the at least one counterpart magnetic unit and the at least one magnetic unit attract each other magnetically to have the magnetically attachable module magnetically attached to the power plug adapter.

9. The power plug adapter according to claim 8, wherein the signal transmission device is connected, through electrical cables, to the first circuit of the power plug adapter and the second circuit of the magnetically attachable module.

10. The power plug adapter according to claim 8, wherein the signal transmission device comprises a first wireless transceiver that is connected to the first circuit and a second wireless transceiver connected to the second circuit of the magnetically attachable module, so that wireless connection between the first circuit and the second circuit is established through the first wireless transceiver and the second wireless transceiver.

11. The power plug adapter according to claim 8, wherein the first circuit comprises a voltage sensor connected to the insertion holes and a current sensor connected between the insertion holes and the prongs.

\* \* \* \* \*